US012710012B2

(12) United States Patent
Tunzini et al.

(10) Patent No.: US 12,710,012 B2
(45) Date of Patent: Aug. 18, 2026

(54) AUXILIARY POWER UNIT COMPRISING A GAS GENERATOR IN DIRECT-DRIVE CONNECTION WITH AN ELECTRIC GENERATOR AND AN ACCESSORY GEARBOX

(71) Applicant: SAFRAN POWER UNITS, Toulouse (FR)

(72) Inventors: Marc Daniel Tunzini, Moissy-Cramayel (FR); Denis Antoine Julien Real, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 68 days.

(21) Appl. No.: 17/784,048

(22) PCT Filed: Dec. 7, 2020

(86) PCT No.: PCT/EP2020/084826
§ 371 (c)(1),
(2) Date: Jun. 9, 2022

(87) PCT Pub. No.: WO2021/115996
PCT Pub. Date: Jun. 17, 2021

(65) Prior Publication Data

US 2023/0021361 A1 Jan. 26, 2023

(30) Foreign Application Priority Data

Dec. 13, 2019 (FR) ...................................... 1914417

(51) Int. Cl.
*F02C 7/32* (2006.01)
*B64D 41/00* (2006.01)

(52) U.S. Cl.
CPC ................ *F02C 7/32* (2013.01); *B64D 41/00* (2013.01); *F05D 2220/50* (2013.01); *F05D 2220/76* (2013.01)

(58) Field of Classification Search
CPC ... F02C 7/32; F02C 7/36; B64D 41/00; F05D 2220/76; F05D 2220/50
See application file for complete search history.

(56) References Cited

U.S. PATENT DOCUMENTS 5,555,722 A 9/1996 Mehr-Ayin et al.
2003/0131605 A1* 7/2003 Meisner .................... F02C 9/28 60/773

(Continued)

FOREIGN PATENT DOCUMENTS

CN 107923314 A * 4/2018 ............. B64D 41/00
EP 2025899 A2 * 2/2009 ............. B64D 41/00

(Continued)

OTHER PUBLICATIONS

English translation of Written Opinion mailed Mar. 1, 2021, issued in corresponding International Application No. PCT/EP2020/084826, filed Dec. 7, 2020, 4 pages.

(Continued)

*Primary Examiner* — Joshua D Huson
(74) *Attorney, Agent, or Firm* — CHRISTENSEN O'CONNOR JOHNSON KINDNESS PLLC

(57) ABSTRACT

An auxiliary power unit, in particular for an aircraft, includes a gas generator and an electric generator. The electric generator has an input shaft that is connected to an output shaft of the gas generator. The auxiliary power unit also has an accessories housing directly connected to a rotor shaft of the electric generator. The electric generator is interposed between the gas generator and the accessories housing.

8 Claims, 1 Drawing Sheet

(56) References Cited

U.S. PATENT DOCUMENTS

| | | | | |
|---|---|---|---|---|
| 2017/0218848 | A1* | 8/2017 | Alstad | B64D 41/00 |
| 2018/0306109 | A1* | 10/2018 | Marcucci | H02P 9/06 |
| 2019/0363610 | A1* | 11/2019 | Wojcik | F01D 25/28 |

FOREIGN PATENT DOCUMENTS

| | | | | |
|---|---|---|---|---|
| EP | 2 452 879 | A2 | 5/2012 | |
| GB | 2436708 | A * | 10/2007 | F02C 3/22 |
| WO | 03/044328 | A1 | 5/2003 | |
| WO | 2018/055287 | A1 | 3/2018 | |

OTHER PUBLICATIONS

International Preliminary Report on Patentability mailed May 17, 2022, issued in corresponding International Application No. PCT/EP2020/084826, filed Dec. 7, 2020, 5 pages.

International Search Report mailed Mar. 1, 2021, issued in corresponding International Application No. PCT/EP2020/084826, filed Dec. 7, 2020, 6 pages.

Written Opinion mailed Mar. 1, 2021, issued in corresponding International Application No. PCT/EP2020/084826, filed Dec. 7, 2020, 4 pages.

* cited by examiner

AUXILIARY POWER UNIT COMPRISING A GAS GENERATOR IN DIRECT-DRIVE CONNECTION WITH AN ELECTRIC GENERATOR AND AN ACCESSORY GEARBOX

FIELD OF THE DISCLOSURE

The present disclosure relates to the field of turbomachines, such as an aircraft turbojet engine or turboprop, and in particular auxiliary power units called, whose acronym is APU.

By auxiliary power units, it should be understood turbogenerators configured to produce electrical or also pneumatic energy on board the aircraft, by driving, inter alia, electric generators.

BACKGROUND

In general, APUs are used to supply electrical or pneumatic energy to different systems when the aircraft is on the ground or in flight. For example, an APU used only in a turbogenerator mode will exclusively output electrical energy to contribute to the power supply of the hybrid propulsion drive of an aircraft.

In general, APUs are positioned at the rear of the aircraft, in particular in the tail cone, and supplied with kerosene from the tanks of the aircraft.

Typically, a gas turbine type APU comprises a gas generator in which all available mechanical power is converted into electrical energy, an air compressor mounted on the main shaft of the gas generator and configured to supply the necessary pneumatic power to the aircraft. An APU further comprises an accessory box, known as an "accessory gearbox", whose acronym is AGB, containing a gear train mechanism connected to different pieces of equipment or accessories, such as, for example, the electric generator, the fuel pumps, the lubrication unit, the starter, or other auxiliary accessories of the engine and of the power generation of the aircraft. The APU also comprises a generator to supply electrical power on board the aircraft.

Auxiliary power units could also provide pneumatic or mechanical energy according to specific needs.

It is known to position the accessory gearbox between the electric generator and the gas generator.

Nonetheless, the area interposed between the electric generator and the gas generator is difficult to exploit. In addition, such a solution requires an accessory gearbox with large dimensions.

Moreover, upon the passage of the motor shaft throughout the accessory gearbox to drive the electric generator, the electric generator could become centred on the axis of the gas generator, which then limits the space available for the accessories.

Reference may be made to the document U.S. Pat. No. 5,309,708 which describes an electric generator connected to a gas generator via an accessory gearbox.

Hence, there is a need to optimise, in terms of bulk, the integration of an accessory gearbox in an axillary power unit.

SUMMARY

Hence, the present disclosure aims to overcome the drawbacks of the aforementioned auxiliary power units and to provide a compact auxiliary power unit having reduced lateral bulk.

Hence, an object of the disclosure is an auxiliary power unit, in particular for an aircraft, comprising a gas generator and an electric generator including an input shaft connected to an output shaft of the gas generator.

The auxiliary power unit comprises an accessory gearbox directly connected to a rotor shaft of the electric generator, the electric generator being mounted or interposed between the gas generator and the accessory gearbox.

In other words, the gas generator is directly coupled with the electric generator, without any intermediate element.

The positioning of the accessory gearbox allows limiting the radial bulk of the auxiliary power unit. Indeed, it is no longer necessary to offset the accessories.

According to an advantageous embodiment, the accessory gearbox comprises a casing.

For example, the casing is substantially disk-like shaped with a diameter smaller than or equal to the diameter of the electric generator.

According to one embodiment, the accessory gearbox comprises a central pinion mounted in the casing and coupled to the shaft of the rotor of the electric generator.

For example, the shaft of the central pinion is fitted onto the rotor shaft of the electric generator.

According to one embodiment, the accessory gearbox comprises at least two reduction mechanisms each coupled to the central pinion and to a drive shaft for the rotational drive of a corresponding accessory.

It should be noted that the present disclosure is not limited to the structure of the accessory gearbox.

For example, the accessory gearbox is made by machining a metal part.

According to one embodiment, the gas generator comprises a gas turbine and a main air compressor driven in rotation by the gas turbine.

The gas generator may comprise a load compressor mounted axially between the main air compressor and the electric generator.

For example, the input shaft of the electric generator is coaxial with the output shaft of the gas generator and secured in rotation with it.

In the case where the gas generator is devoid of any load compressor, the input shaft of the electric generator is directly connected to the output shaft of the gas generator, so that the electric generator is directly coupled with the gas generator.

According to a second aspect, the disclosure relates to a turbomachine for an aircraft comprising at least one auxiliary power unit as described before.

DESCRIPTION OF THE DRAWINGS

Other aims, features and advantages of the disclosure will appear upon reading the following description, given only as a non-limiting example, and made with reference to the indexed drawings wherein.

In the following description, the terms "upstream" and "downstream" are defined with respect to the direction of circulation of air in the auxiliary power unit.

DETAILED DESCRIPTION

Figure 1:
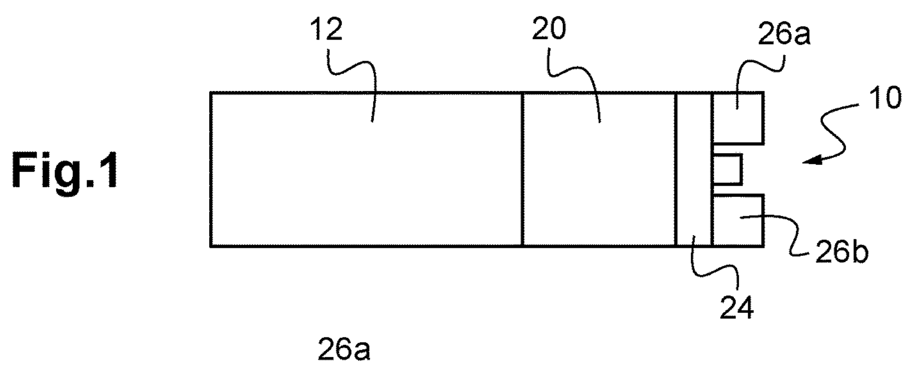
FIG. 1 illustrates, very schematically, an auxiliary power unit according to an embodiment of the disclosure.

In FIG. 1, an auxiliary power unit 10 for an aircraft turbomachine is represented, very schematically.

In general, the auxiliary power unit 10 is used to supply electrical or pneumatic energy to different systems when the aircraft is on the ground or in flight. For example, an auxiliary power unit used in a turbogenerator mode will exclusively output electrical energy to contribute to the power supply of the hybrid propulsion drive of an aircraft.

For example, the auxiliary power unit is positioned at the rear of the aircraft, in particular in the tail cone, and supplied with kerosene from the tanks of the aircraft.

As illustrated, the auxiliary power unit 10 comprises, in the axial direction from downstream to upstream, a gas generator 12, an electric generator 20 coupled to the gas generator 12 to supply electrical energy on board the aircraft and an accessory box or gearbox 24, known as "accessory gearbox", whose acronym is AGB, arranged upstream of the electric generator 20 and coupled to the electric generator 20.

The gas generator 12, the electric generator 20 and the accessory gearbox 24 are coaxial.

The accessory gearbox 24 comprises a reduction mechanism (not visible in FIGS. 1 and 2) connected to different pieces of equipment or accessories 26*a*, 26*b*, such as, for example, an electric generator, fuel pumps, a lubrication unit, a starter, or other auxiliary accessories of the engine and of the power generation of the aircraft.

Figure 2:
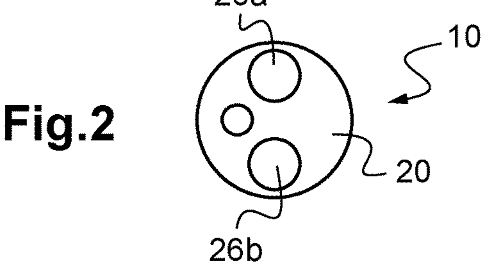
FIG. 2 is a side view of the auxiliary power unit of FIG. 1.

As could be seen in FIG. 2, the accessory gearbox 24 comprises a casing having a simple geometric shape, whose bulk in radial section is substantially the same as that of the electric generator 20. For example, this casing may be disk-like shaped with a diameter substantially equal to the diameter of the electric generator 20. Thus, the radial bulk of the accessory gearbox 24 is limited.

Figure 3:
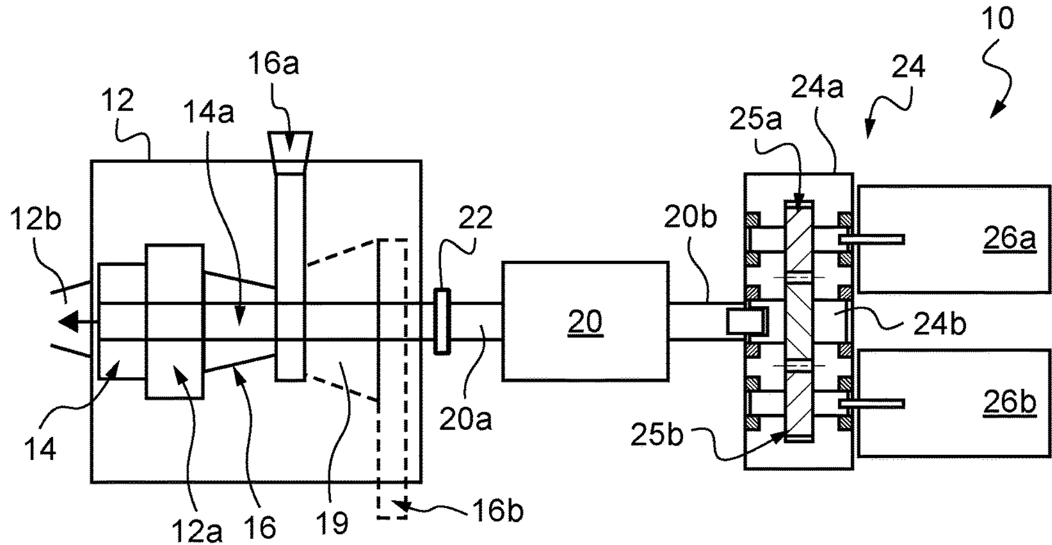
FIG. 3 illustrates in details an auxiliary power unit according to an embodiment of the disclosure.

FIG. 3 represents in details an example of a gas generator 12 and an accessory gearbox 24 used in the auxiliary power unit 10. It should be noted that the disclosure is not limited to such an example.

As illustrated, the gas generator 12 comprises a gas turbine 14 comprising a main shaft 14*a* rotatably coupled to a main air compressor 16. The main air compressor 16 comprises an air inlet 16*a*. The gas generator 12 further comprises a combustion chamber section 12*a* and an exhaust nozzle 12*b* downstream of the gas turbine 14 to evacuate the combustion products according to the arrow represented in FIG. 3.

In the illustrated example, the output shaft of the gas turbine 14 and the input shaft of the main air compressor 16 are a common shaft 14*a*. Alternatively, it is possible to provide for an output shaft of the gas turbine 14 that is distinct from the input shaft of the main air compressor 16 and coupled to the input shaft by a coupling system.

Without limitation, the gas generator 12 may also comprise a load compressor 19, represented in dotted lines in FIG. 3, coupled to the shaft 14*a* of the gas turbine 14. The load compressor 19 is configured to supply pressurised air on board the aircraft.

As illustrated, the gas generator 12 comprises an air outlet 16*b* upstream of the load compressor 19 in the case where a load compressor is present.

In the case where the load compressor 19 is not present, the shaft 14*a* of the gas turbine 14 is directly coupled to the input shaft 20*a* of the electric generator 20, using a second coupling system 22. The latter may consist, for example, of a system for coupling by splines between the two shafts 14*a* and 20*a* or else of a flexible connection system allowing damping the vibrations transmitted from the shaft 14*a* towards the input shaft 20*a*. Thus, the gas generator 12 is directly coupled with the electric generator 20, without any intermediate element for taking up mechanical energy from the gas generator such as a load compressor or an accessory gearbox.

The electric generator 20 further comprises an output shaft 20*b* or rotor shaft directly connected to the accessory gearbox 24.

Figure 4:
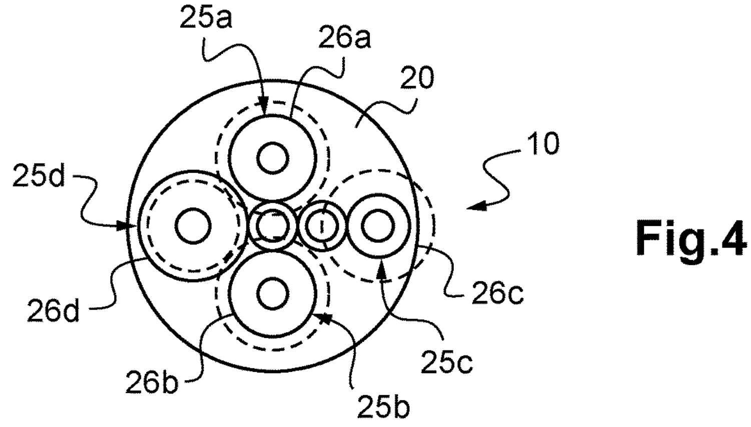
FIG. 4 is a side view of the auxiliary power unit of FIG. 2.

As illustrated in FIGS. 3 and 4, the accessory gearbox 24 comprises a casing 24*a* in which is mounted a central pinion 24*b* coupled to the shaft of the rotor 20*b* of the electric generator 20 and for example four reduction mechanisms 25*a*, 25*b*, 25*c*, 25*d* only two of which are visible in FIG. 3. Each of the reduction mechanisms 25*a*, 25*b*, 25*c*, 25*d* is coupled to the central pinion 24*b* and to a drive shaft for driving in rotation a corresponding accessory 26*a*, 26*b*, 26*c*, 26*d*. The contours of the bodies of the accessories 26*a*, 26*b*, 26*c*, 26*d* are represented by dotted lines in FIG. 4, which shows an example of an optimisation of the space occupied by these accessories. The number of reduction mechanisms is linked to the number of accessories to be driven, and could of course be other than four.

The shaft of the central pinion 24*b* could be fitted, for example using splines, onto the rotor shaft 20*b* of the electric generator 20.

Such an accessory gearbox is no longer intended to serve as an oil tank which could then be shifted. Hence, the only function of the accessory gearbox 24 is to drive the accessories and could thus be made by machining a metal part, without resorting to costly foundry processes.

The positioning of the accessory gearbox 24 at the rear of the electric generator 20 allows retaining the rotor of the electric generator inside its stator in the event of failure. Indeed, in the event of mechanical breakage of a rotor at high speed, the rear flange of the electric machine is generally pulled off, which could lead to the ejection of the rotor. Hence, the accessory gearbox 24 allows avoiding the axial ejection of the rotor by ensuring the function of locking the rotor.

Thanks to the disclosure, the accessory gearbox 24 could be particularly compact radially. It could support accessories relatively slightly offset with respect to a central axis of the box 24, in comparison with the prior art.

The positioning at the rear of hydraulic pumps on the accessories box 24 allows making the flows, in particular oil and fuel, transit through the electrical and electronic equipment of the electric generator 20, in order to ensure cooling of the equipment that are sensitive to high temperatures.

The positioning of the accessory gearbox 24 also has the advantage of being able to drive a cooling fan for example for a heat exchanger.

Finally, in contrast with the accessory gearboxes known from the prior art, the accessory gearbox according to the disclosure no longer ensures the function of mechanically holding the auxiliary power unit on the aircraft, which is now ensured by means of the casing of the electric generator.

The invention claimed is:

1. An auxiliary power unit, comprising:

a gas generator comprising successively along a same axis, an exhaust nozzle, a gas turbine, a combustion chamber section and a main air compressor driven in rotation by said gas turbine;

an electric generator including an input shaft connected to an output shaft of the gas generator, the electric generator being coupled to the gas generator upstream of the main air compressor, on a side opposite to the gas turbine; and an accessory gearbox directly connected to a rotor shaft of the electric generator, the gearbox having a casing with radial dimensions smaller than or equal to radial dimensions of the electric generator, wherein the electric generator is mounted between the gas generator and said accessory gearbox, wherein the auxiliary power unit is configured to provide energy to an aircraft, and wherein the gas generator comprises a load compressor driven in rotation by the gas turbine and mounted axially between the main air compressor and the electric generator.

2. The auxiliary power unit according to claim 1, wherein the accessory gearbox comprises a central pinion mounted in the casing and coupled to the shaft of the rotor of the electric generator.

3. The auxiliary power unit according to claim 2, wherein the shaft of the central pinion is fitted onto the rotor shaft of the electric generator.

4. The auxiliary power unit according to claim 2, wherein the accessory gearbox comprises at least two reduction mechanisms each coupled to the central pinion and to a drive shaft for the rotational drive of a corresponding accessory.

5. The auxiliary power unit according to claim 1, wherein the accessory gearbox is made by machining a metal part.

6. The auxiliary power unit according to claim 1, wherein the input shaft of the electric generator is coaxial with the output shaft of the gas generator and secured in rotation with it.

7. The auxiliary power unit according to claim 1, wherein the input shaft of the electric generator is directly connected to the output shaft of the gas generator, so that the electric generator is directly coupled with the gas generator.

8. A turbomachine for an aircraft comprising at least one auxiliary power unit according to claim 1.

* * * * *